US006389481B1

(12) United States Patent
Malcolm

(10) Patent No.: US 6,389,481 B1
(45) Date of Patent: May 14, 2002

(54) AUTOMATIC PROGRAM DOCUMENTATION

(75) Inventor: Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/301,833

(22) Filed: Sep. 6, 1994

Related U.S. Application Data

(63) Continuation of application No. 07/747,170, filed on Aug. 19, 1991, now abandoned.

(51) Int. Cl.[7] .................................................. G06F 9/45
(52) U.S. Cl. ............................ 709/310; 709/315; 717/6
(58) Field of Search ....................... 395/700; 364/277.5, 364/280.4; 709/310, 315, 328; 717/1–9

(56) References Cited

U.S. PATENT DOCUMENTS

| | | | | |
|---|---|---|---|---|
| 4,398,249 A | * | 8/1983 | Pardo et al. | 364/300 |
| 4,488,258 A | | 12/1984 | Struger et al. | |
| 4,617,643 A | * | 10/1986 | Kloch et al. | 364/900 |
| 4,636,940 A | * | 1/1987 | Goodwin, Jr. | 364/200 |
| 4,860,203 A | * | 8/1989 | Corrigan et al. | 364/300 |
| 5,956,508 A | * | 9/1999 | Johnson | 395/683 |

OTHER PUBLICATIONS

Operating Systems : A Systematic View, W.S. Davis, Addison–Wesley Publishing Company, May 1987, pp. 19, 25–26.*
IBM Technical Disclosure Bulletin, vol. 15, No. 7, Dec. 1972, "Self–Documenting Macros", A. Lichtman, p. 2153.
IBM Technical Disclosure Bulletin, vol. 24, No. 12, May 1982, "Computer Program Documentation", R. D. Parrott, p. 6540.
IBM Technical Disclosure Bulletin, vol. 30, No. 12, May 1988, "Automatic Retrieval of Program Design Information from Source Code", p. 120.
Abstract of Logic Gem by International Computer Programs Inc.
Abstract of DCD III by International Computer Programs Inc.
Abstract of DCD–PC by International Computer Programs Inc.
Abstract of "The Documentor" for "dFlow" by International Computer Programs, Inc.

* cited by examiner

Primary Examiner—Zarni Maung
(74) Attorney, Agent, or Firm—Paul S. Drake; Volel Emile; Leslie A. VanLeeuwen

(57) ABSTRACT

An apparatus for producing object code from source code including input means for receiving the source code, the source code including executable source code and source code documentation, and compilation means, coupled to the input means, including first means for providing object code from the source code, and second means for providing documentation including selected portions of the executable source code and the source code documentation, and for organizing the provided documentation into a predefined format independent of executable source code organization. In addition, a method of for producing object code from source code including the steps of receiving the source code, the source code including executable source code and source code documentation, and compiling the received source code including the steps of providing object code from the source code, and providing documentation including selected portions of the executable source code and the source code documentation, and organizing the provided documentation into a predefined format independent of executable source code organization.

28 Claims, 12 Drawing Sheets

Panel

Name
    Description
    Label
    help
    Keys help
    Attributes
        Defaultsysmenu
        Initialstate
        Maximizeable
        Sizeable
        Modal
        Tasklist
    Actions
    Interactions
    Options
    Layout Rules
    Resources
    Defaults
    Comments

```
:ui.
:windowdef text='Configuration Path'
         maximizeable=YES modal=NO taskline=YES sizeable=YES.
      :documentation type=descr.
         This panel is displayed to request configuration information        5
         from the user.
      :/documentation.
      :helptext title='Configuration Path Help Text'.
         'Main panel help text . . .
      :/helptext                                                             10
      :/helptext type=keys title='Keys Help Text'.
         'Keys help text . . .
      :/helptext
                                                                             15
      :outputf text='Configuration:' id=CFGFILE width=16 scroll=YES
            default='Config'.
         :helptext 'Configuration Help Text'.
            The 'Configuration' field displays . . .
         :helptext.                                                          20
         :documentation type=descr.
            This field is used by the product to display the
            currently opened configuration file.
         :/documentation.
         :documentation type=interaction.                                    25
            This field is a read only field. The product will
            output the data, and the user can only view the data.
            If the length of the displayed data is less than the width of
            this field, then the arrows on each side of this field will be
            greyed out; otherwise, these arrows will be displayed.           30
         :/documentation
         :documentation type=defaults.
            This field is always defaults to the opened configuration file.
         :/documentation.                                                    35
:/windowdef.
```

FIG. 6

```
.* Documentation file for panel: DOCSAMPL
*
.
:h4.Panel: DOCSAMPL - Configuration Path
:dl tsize=25 compact.
:dt.Panel description:
:dd.
This panel is displayed to request configuration information
from the user.
:edl.
*
.                                                                    10
─────────────────────────────────────────────────────────────────────
:fig place=inline id=CSAMPL.
:figcap.Configuration Path (DOCSAMPL)
: artwork runin name=DOCSAMPL.
:efig.
*
.
:dl tsize=25 compact.
:dthd.Panel Parameter
:ddhd.Field Definition
.sp 2
*
.                                                                    20
─────────────────────────────────────────────────────────────────────
:dt.Panel attributes:
:dd.
:ul compact.
:li. :hp2.DEFAULTSYSMENU:ehp2. = YES
:li. :hp2.INITIALSTATE:ehp2. = DEFAULT
:li. :hp2.MAXIMIZEABLE:ehp2. = YES
:li. :hp2.MODAL:ehp2. = NO
:li. :hp2.SIZEABLE:ehp2. =YES
:li. :hp2.TASKLIST:ehp2. = YES
:eul.                                                                30
─────────────────────────────────────────────────────────────────────
:sp
:dt.Panel label:
:dd.
hp3.None:ehp3.
:dt.Panel layout rules:
:dd.
```

FIG. 8A

```
hp3.None:ehp3.
:dt.Panel resources:
:dd.
:hp2.ICON:ehp2. = :hp1.Not specified:ehp1.                                    40
:dt.Panel defaults:
:dd.
:hp3.None:ehp3.
:dt.Panel options:
:dd.
:hp3.None:ehp3.
:dt.Panel actions:
:dd.
:hp3.None:ehp3.
:dt.Panel interactions:                                                       50
:dd.
:hp3.None:ehp3.
:dt.Panel help:
:dd.
(id=1000) 'Main panel help text . . .
:dt.Panel keys help:
:dd.
(id=1001) 'Keys help text . . .
.sp 3
*
.                                                                             60
*
.
:dt.Control prompt:
:dd.
Configuration:
:dt.Control type:
:dd.
Output Field
:dt.Control description:
:dd.
This field is used by the product to display the                              70
currently opened configuration file.
:dt.Control text:
:dd.
:ul compact.
```

FIG. 8B

```
:li. :hp2.PREFIX:ehp2. = :hp1.Not specified:ehp1.
:li. :hp2.SUFFIX:ehp2. = :hp1.Not specified:ehp1.
:eul.
.sp
:dt.Control attributes:
:dd.                                                                    80
:ul compact.
:li. :hp2.DATAJUSTIFY:ehp2. = LEFT
:li. :hp2.EXPAND:ehp2. = NONE
:li. :hp2.INITIAL_FOCUS:ehp2. = NO
:li. :hp2.SCROLL:ehp2. = YES
:eul.
.sp
:dt.Control label:
:dd.
CFGFILE                                                                 90
:dt.Control size:
:dd.
:hp2.WIDTH:ehp2. = 16
.dt.Control layout rules:
:dd.
:ul compact.
:li. :hp2.JUSTIFY:ehp2. = ALIGN
:li. :hp2.POS:ehp2. = LEFT
:li. :hp2.VPOS:ehp2. = :hp1.Not specified:ehp1.
:eul.                                                                   100
.sp
:dt.Control resources:
:dd.
:hp3.None:ehp3.
:dt.Control defaults:
:dd.
This field is always defaults to the opened configuration file.
:dt.Control options:
:dd.
:hp3.None:ehp3.                                                         110
```

FIG. 8C

```
:dt.Control actions:
:dd.
:hp3.None:ehp3.
:dt.Control interactions:
:dd.
This field is a read only field. The product will
output the data, and the user can only view the data.
If the length of the displayed data is less than the width of
this field, then the arrows on each side of this field will be
greyed out; otherwise, these arrows will be displayed.          120
:dt.Control help:
:dd.
(id=1002) The 'Configuration' field displays ...
.sp 3
*
.
*
.
:edl.
```

FIG. 8D

Panel: DOCSAMPL - Configuration Path

| | |
|---|---|
| Panel description: | This panel is displayed to request configuration information from the user. |

Figure 1. Configuration Path (DOCSAMPL)

| Panel Parameter | Field Definition |
|---|---|
| Panel attributes: | |
| | • DEFAULTSYSMENU = YES |
| | • INITIALSTATE = DEFAULT |
| | • MAXIMIZEABLE = YES |
| | • MODAL = NO |
| | • SIZEABLE = YES |
| | • TASKLIST = YES |
| Panel label: | None |
| Panel layout rules: | None |
| Panel resources: | ICON = Not specified |

FIG. 9A

Panel defaults:       None
Panel options:        None
Panel actions:        None    ╱—901
Panel interactions:   None   ╱
Panel help:           (id=1000) 'Main panel help text . . .
Panel keys help:      (id=1001) 'Keys help text . . .
                          ╲—902

Control prompt:       Configuration:
Control type:         Output Field
Control description:  This field is used by the product to display the currently opened configuration file.
Control text:

• PREFIX = Not specified
    • SUFFIX = Not specified

Control attributes:

• DATA JUSTIFY = LEFT
    • EXPAND = NONE
    • INITIAL_FOCUS = NO
    • SCROLL = YES

Control label:        OF_PL_CFGFILE ╲—910
Control size:         WIDTH = 16
Control layout rules:

• JUSTIFY = ALIGN
    • POS = LEFT
    • VPOS = Not specified

Control resources:    None
Control defaults:     This field is always defaults to the opened configuration file.
Control options:      None
Control actions:      None
Control interactions: This field is a read only field. The product will output the data, and the user can only view the data. If the length of the displayed data is less than the width of this field, then the arrows on each side of this field will be greyed out; otherwise, these arrows will be displayed.
Control help:         (id=1002) The 'Configuration' field displays . . .
                          ╲—910

FIG. 9B

AUTOMATIC PROGRAM DOCUMENTATION

RELATED PATENT APPLICATIONS

This is a continuation of application Ser. No. 07/747,170 filed Aug. 19, 1991 now abandoned.

This patent application is related to patent application Ser. No. 07/747,167, filed Aug. 19, 1991, now U.S. Pat. No. 5,533,184, entitled "Computer System for Dynamically Generating Display Screen Panels providing Interactive Interfaces for Application Program Steps" hereby incorporated by reference; patent application Ser. No. 07/747,169, filed Aug. 19, 1991, now abandoned, entitled "Creating Multiple Versions of Panels from a Single Panel Definition File" hereby incorporated by reference; and patent application Ser. No. 07/747,168 filed Aug. 19, 1991, now U.S. Pat. No. 5,416,903, entitled "A System and Method for Supporting Multilingual Translations of a Windowed User Interface" hereby incorporated by reference.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

1. Technical Field

The present invention relates generally to providing program documentation and more specifically to providing program documentation during program compilation.

2. Background Art

Providing computer software documentation has been one of the most difficult and cumbersome aspects of software development. The source code programmer usually provides some documentation in the code. This documentation is commonly referred to as comment statements and includes text information that is not compiled when the source code is compiled into object code. Prior use of comments in source code is disclosed in U.S. Pat. No. 4,488,258 entitled "Programmable Controller with Control Program Comments" which discloses a controller system that provides a means for producing a mnemonic and comment number when comments are entered into a terminal keyboard wherein the comments are stored separately from the program and automatically displayed to the user. Other attempts at using comments in the source code to document the source code include IBM Technical Disclosure Bulletin, Vol. 15. No. 7, December, 1972 entitled "Self-Documenting Macros", IBM Technical Disclosure Bulletin, Vol. 24, No. 12, May, 1982 entitled "Computer Program Documentation", and IBM Technical Disclosure Bulletin, Vol. 30, No. 12, May, 1988, entitled "Automatic Retrieval of Program Design Information from Source Code".

There are some modern documentation software tools such as Logic Gem, DCD-PC and DCD III by International Computer Programs, Inc., and dFlow by WallSoft Systems, Inc. These tools review the source code and generate various reports including flow-charts, module cross reference lists, a variable concordance, and logic spreadsheets. However, these tools are limited to reviewing the executable source code to generate these reports and are primarily for aiding the developer or maintainer of the source code rather than the user.

U.S. Pat. No. 4,860,203 discloses a system extracting documentation text from a source code program during compilation in the order of appearance in the source program. This patent provides a method for generating pseudocode from the source code.

DISCLOSURE OF THE INVENTION

The present invention provides an apparatus for producing object code from source code including input means for receiving the source code, the source code including executable source code and source code documentation, and compilation means, coupled to the input means, including first means for providing object code from the source code, and second means for providing documentation including selected portions of the executable source code and the source code documentation, and for organizing the provided documentation into a predefined format independent of executable source code organization.

The present invention also provides a method of for producing object code from source code including the steps of receiving the source code, the source code including executable source code and source code documentation, and compiling the received source code including the steps of providing object code from the source code, and providing documentation including selected portions of the executable source code and the source code documentation, and organizing the provided documentation into a predefined format independent of executable source code organization.

A further understanding of the nature and advantages of the present invention may be realized by reference to the remaining portions of the specification and the drawing.

BRIEF DESCRIPTION OF THE DRAWING

FIG. 6 is an example of source code including executable source code, help code and documentation for generating the window illustrated in FIG. 5;

FIGS. 8A, 8B, 8C and 8D are a copy of a program documentation file generated by the documentation organizer during compilation of the source code illustrated in FIG. 6;

FIG. 9 is a copy of the final printout of the panel documentation report derived from the source code shown in FIG. 6.

BEST MODE FOR CARRYING OUT THE INVENTION

Figure 1:
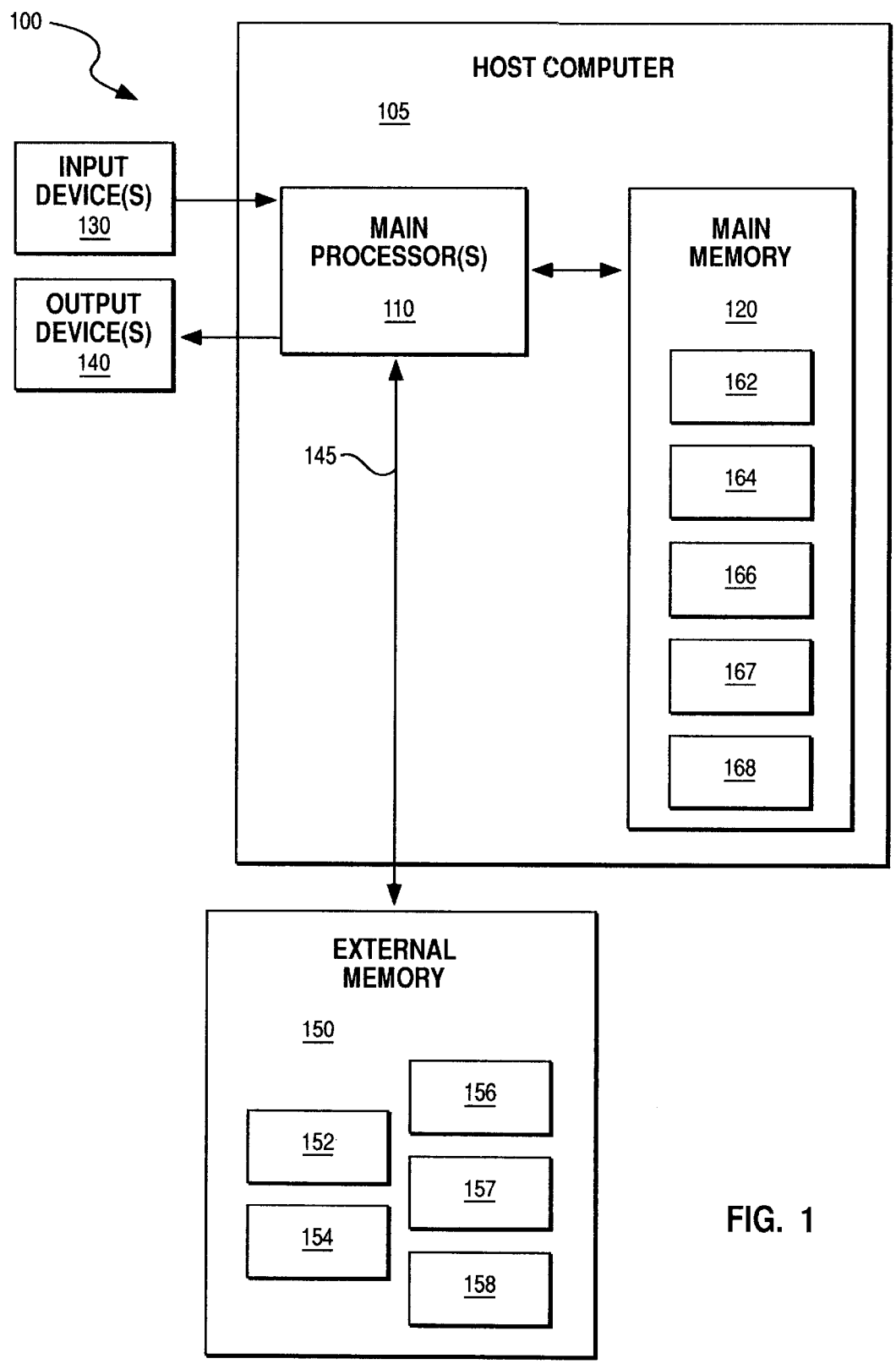
FIG. 1 is a block diagram of a typical digital computer that may utilize a preferred embodiment of the invention.

FIG. 1 is a block diagram of a typical digital computer 100 utilizing a preferred embodiment of the invention. The computer system includes a host computer 105. The host computer includes main processor(s) 110 coupled to an internal memory 120, input device(s) 130, output device(s) 140, and external storage device(s) 150 on bus 145. Main processor(s) 110 may include a single processor or multiple processors. Input device(s) 130 may include a keyboard, mouse, tablet or other type of input devices. Output device (s) 140 may include a printer, text monitor, plotter or other types of output devices. External storage device(s) 150 may include magnetic disks, magnetic tape, optical disks, etc. External storage 150 stores data and code to be used by the main processor in the future. A compiler 152 and source code 154 may be stored on the external storage until needed by the main processor. At that time, the compiler and the source code are loaded into internal memory 120 via bus 145 as compiler 162 and source code 164. In the preferred embodiment, the main processor then executes compiler 162 which reads and compiles the source code 164 thereby generating object code 166, help code 167 and program documentation 168 in main memory. The program object code, help code and program documentation may then be loaded back into external storage as object code 156 and help code 157 until the main processor is ready to execute the object code and help code. At that time, the object code and help code would be reloaded into main memory. Program documentation 168 may be immediately printed by main processor 110 on output device 140. The program documentation may also be stored on external memory 150 as program documentation 158 to be printed at a later date.

Figure 2:
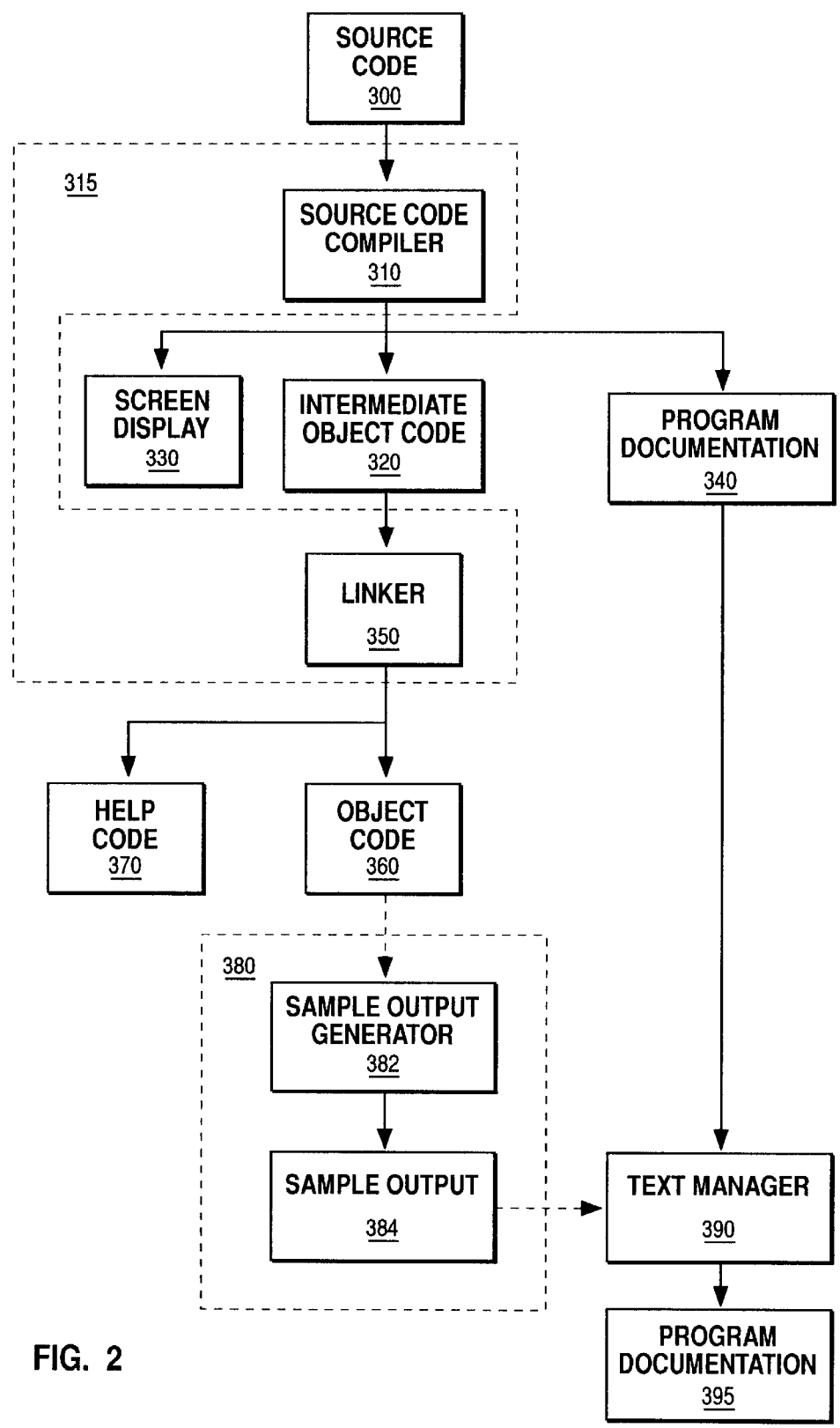
FIG. 2 is a block diagram of a program being compiled into executable object code, program help, and program documentation in the preferred embodiment of the invention.

FIG. 2 is a block diagram of a program or panel (a type of program used to generate a window or panel on a display) being compiled into executable object code, program help, and program documentation in the preferred embodiment of the invention. Source code 300 is compiled by a source code compiler 310 to generate intermediate object code 320, a program screen display 330, and program documentation 340. The intermediate object code 310 includes both program object code and program help code. In alternative embodiments, separate files may be used for the object code and the help code. However, the complexity of the compilation process would increase slightly due to the increase in the number of files being handled. The program screen display 330 includes any error messages that may arise during the compilation process. In alternative embodiments, a program listing printout or other types of documentation may be used to show errors detected during compilation of the source code. Program documentation 340 includes the organized documentation of the program and may include portions of the source code including executable source code and comments, as well as information provided by the compiler during the compilation process such as the internal number assigned to panels that are to be generated by the object code.

Intermediate object code 320 is then processed by linker 350 to generate system program object code 360 and program help 370. When a linker is used as shown in this embodiment, the source code compiler 310 and linker 350 together are considered to be a two stage compiler 315. In an optional step 380, sample output generator may be used to generate a sample output of the output that may be generated by object code 360. For example, object code 360 may generate a report, printout, or panel with a certain format when executed. Of course, the numeric quantities used in the report, printout or panel are usually not available until the object code is executed. However, a sample of the output could be generated by the sample output generator with any numeric values either left blank or set to some predefined value such as zero.

In the preferred embodiment, a text manager 390 formats the program documentation, which is then printed or displayed as program documentation 395. The text manager may also insert a copy of the sample output into the program documentation to more fully describe the program.

Figure 3:
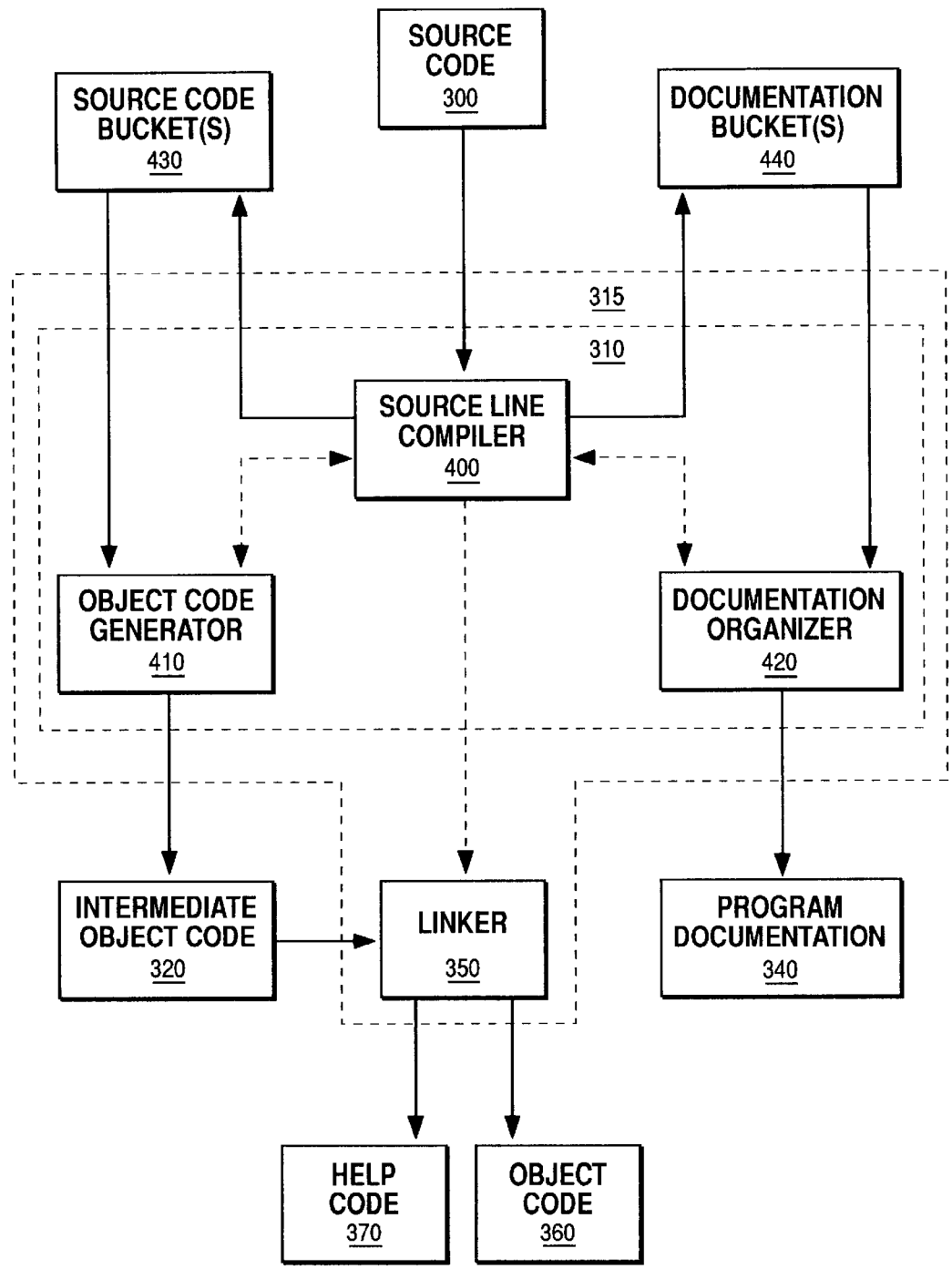
FIG. 3 is a block diagram of the compiler illustrated in FIG. 2.

FIG. 3 is a block diagram of the compiler 315 illustrated in FIG. 2. Compiler 315 includes source code compiler 310 and linker 350. Compiler 310 includes a scan line compiler 400 which scans the source code 300 line by line and generates temporary storage of the source code in source code bucket 430 for processing by object code generator 410. Compiler 400 also generates temporary storage of the program documentation in documentation bucket(s) 440 to be later processed by documentation organizer 420. The compiler also generates error messages and performs many of the other functions of the compiler in a single pass through the code. The scan line compiler invokes execution of object code generator 410 and documentation organizer 420 to process the source code bucket(s) and the documentation bucket(s).

The object code generator 410 then generates intermediate object code 320 from the source code bucket(s) 430. In the preferred embodiment, each source code bucket contains one source code instruction in the format in which it was received from scan line compiler 400.

Documentation organizer 420 then generates program documentation from the documentation bucket(s) 440. In the preferred embodiment, the document organizer is invoked at the completion of the processing of the scan line compiler after all of the documentation buckets have been filled with documentation information. In the preferred embodiment, each documentation bucket includes a data structure containing information extracted from the source code by the scan line compiler. A single data structure in a single documentation bucket or multiple data structures, each containing a separate data structure, may be used. The documentation organizer then reorganizes the documentation in the data structures, thereby generating documentation 340.

Figure 4:
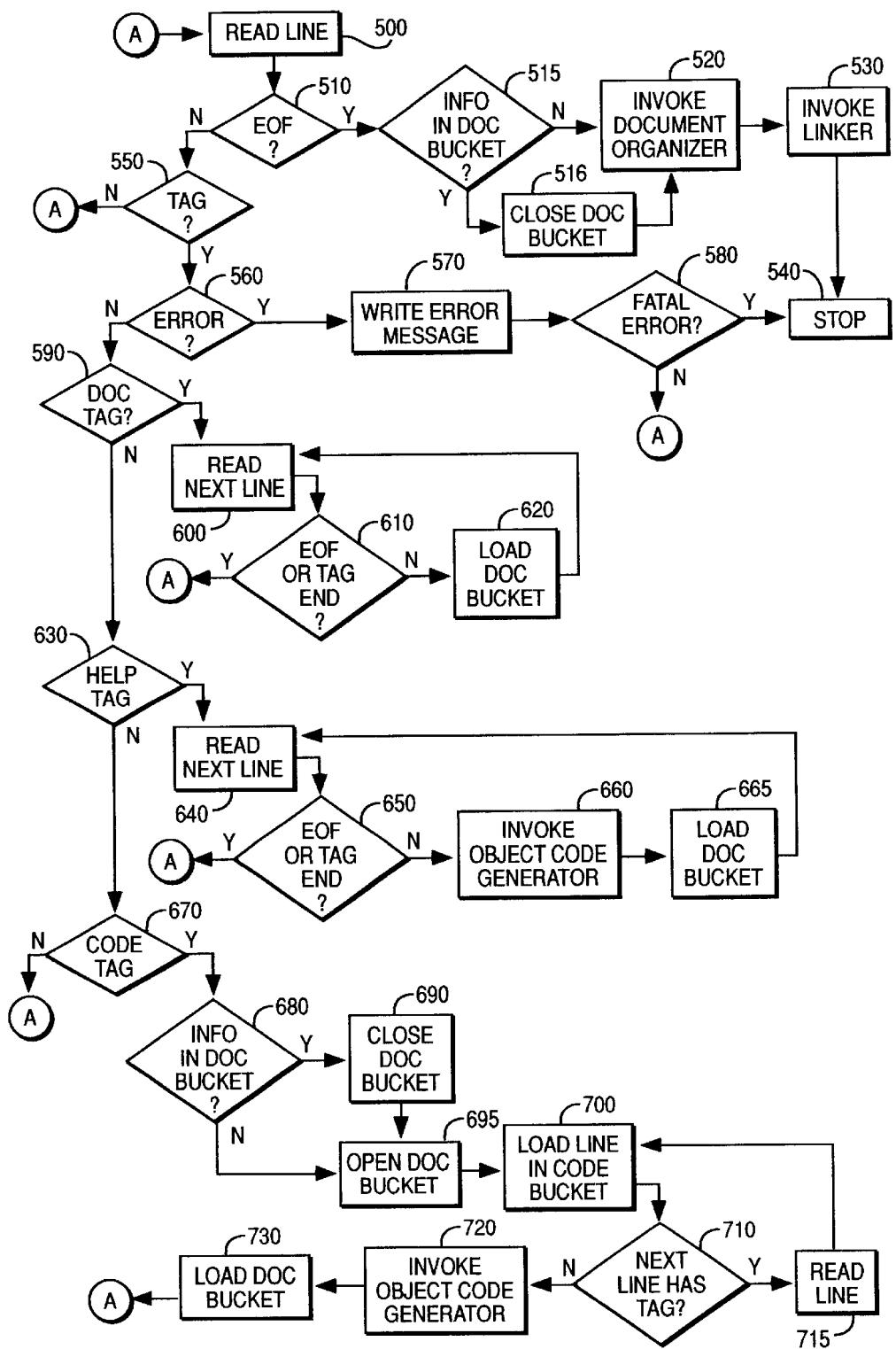
FIG. 4 is a flowchart of the compiler being executed in the preferred embodiment of the invention.

FIG. 4 is a flowchart of the compiler being executed in the preferred embodiment of the invention. In a first step 500, the compiler reads the first line from the source code. In step 510, if the end of file is reached by the read, then steps 515 through 540 are executed. These steps will be covered in more detail later. If the end of file condition is not reached, then the compiler determines whether the line has a tag in step 550. A tag is an instruction to the compiler indicating that the line contains information to be processed by the compiler. There are different tags for different methods of processing of the line by the compiler. In the preferred embodiment, there are three types of tags called document tags for comments and documentation, help tags for help code to generate text for help panels, and code tags for executable source code. If there is no tag, then the line is to be ignored as a program internal comment statement and execution is returned to step 500 to read the next line. If the line is tagged, the compiler determines in step 560 whether the line contains an error condition. If yes, then an error message is written to the display screen in step 570. Subsequently, the compiler determines whether the error is a fatal error in step 580. If yes, then execution is stopped. If no, then execution is returned to step 500 to read the next line.

In step 590 the compiler determines whether the line of source code contains a document tag. If not, then execution continues to step 630. If a document tag is detected, then the line and some subsequent lines are processed as documentation. In the preferred embodiment, the documentation is enclosed between a begin document tag and an end document tag on separate lines of source code. As a result, in step 600 the next line of source code is read. In step 610, it is determined whether the end of file is reached or if an end of document tag is read. If yes, then execution is returned to step 500 to read the next line. If no, then in step 620 documentation information is extracted from the line by the compiler and loaded into a data structure in a documentation bucket. The documentation bucket is a working storage location in main memory for storing data that generally utilizes some sort of data structure to hold the data. Execution is then returned to step 600 to read the next line. This process continues until the end of document tag is reached.

In step 630 the compiler determines whether the line of source code contains a help tag. If not, then execution continues to step 670. If a help tag is detected, then the line and some subsequent lines are processed as help code. In the preferred embodiment, the help code is enclosed between a begin help tag and an end help tag on separate lines of source code. As a result, in step 640 the next line of source code is read. In step 650, it is determined whether the end of file is reached or if an end of help tag is read. If yes, then execution is returned to step 500 to read the next line. If no, then in step 660 the object code generator is invoked to process the help code. Subsequently, in step 665, selected information is extracted from the help code and loaded into the data structure in the documentation bucket.

In step 670, the compiler determines whether the line of source code contains an executable code tag. If not, then execution returns to step 500 to read the next line of source code. If a code tag is detected, then the line is processed as executable source code. In the preferred embodiment, a new documentation bucket is opened each time an executable source code tag is detected. This allows for different data structures for each type of executable source code. Alternative embodiments may use a single data structure resulting in a single documentation bucket being utilized. As a result of the multiple documentation buckets, the compiler determines whether there is an open documentation bucket containing documentation in step 680. If yes, then in step 690 the documentation bucket is closed. In step 695, a new documentation bucket is opened. The new documentation bucket may contain a data structure tailored for the type of source code just read. In the preferred embodiment, the executable source code may be located on a single or multiple lines of source code. As a result, in step 700, the line of code is loaded into the source code bucket. In step 680 the compiler peeks at the next line of source code and determines whether the next line contains more executable source code relating to the current code tag. If yes, then the next line of source code is read in step 715 and execution returns to step 700. If the next line of source code is not related to the current code tag, then the object code generator is invoked in step 720 to process the executable source code stored in the source code bucket. This results in the object code generator providing intermediate object code in the intermediate object code file. Then in step 730, selected information extracted from the source code, the intermediate object code and the object code generator is loaded into the newly opened documentation bucket. Processing then returns to step 500 to read the next line.

After the last line is processed and the end of file condition is reached in step 510, the compiler determines whether there is any information in the documentation bucket in step 515. If yes, then the bucket is closed. The documentation organizer is then invoked instep 540. This portion of the compiler extracts information from the data buckets and generates program documentation file from them. This portion of the compiler may be reprogrammed to modify the content and organization of the program documentation. Upon completion, the linker is invoked to put the object code in final executable form in step 530. Subsequently, execution of the compiler is stopped in step 540.

In the preferred embodiment, the compiler is used to compile source code describing panels or windows which are displayed on a display screen. The source code describing the panels may be generated by hand or by the use of a panel generating program which prompts the programmer for the needed panel attributes, help, and documentation of the panel. The panel source code then contains all the necessary information to allow the compiler to generate the panel object code, the panel help code, and the panel documentation. An example of a panel is described below.

Figures 5, 7:
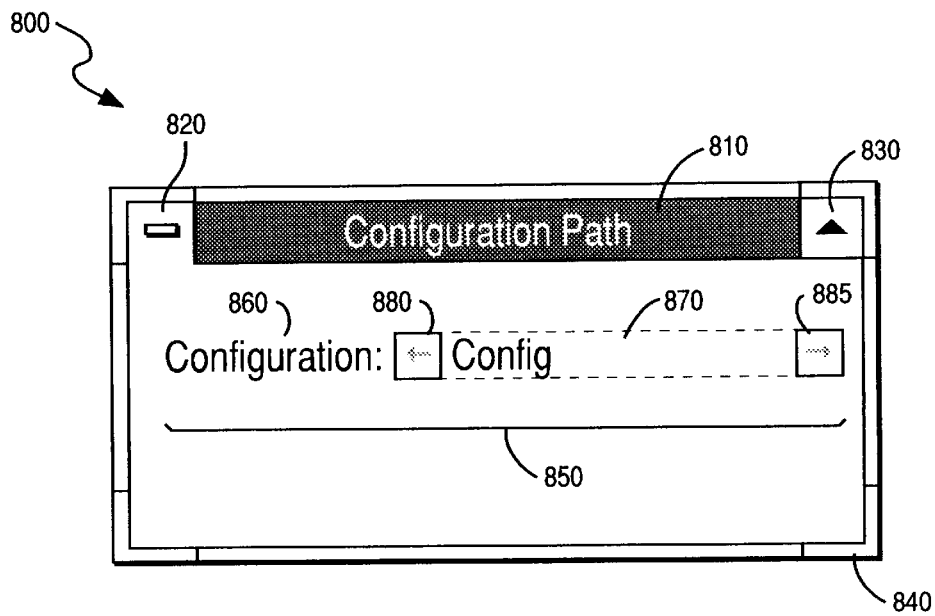
FIG. 5 is an illustration of a panel generated by panel source code in the preferred embodiment of the invention.
FIG. 7 is an illustration of a possible data structure to be used in a documentation bucket to pass extracted documentation information to the documentation organizer.

FIG. 5 is an illustration of a panel 800 generated by panel source code in the preferred embodiment of the invention. The panel includes a title bar 810 giving the title or name of the panel. A system menu button 820 is included which allows the user to open a pulldown menu of functions when the system menu button is clicked by a mouse. A maximize button 830 is included which allows the user to automatically increase the size of the panel to the size of the screen when the maximize button is clicked by a mouse. The panel also includes a sizing border 840 which allows the user to increase and decrease the size of the panel in small increments.

An output element 850 is included which allows the computer to provide information to the user. The output element includes text 860, output field 870 and scroll buttons 880 and 885. Text 860 was defined in the panel source code by the programmer. Output field 870, which is a type of control field, is a field which provides information to the user. Scroll buttons 880 and 885 allow the user to scroll the text provided in the output field by simply clicking the scroll buttons with a mouse. This allows the user to read more text than could be shown at any one time in the output field. For illustrative purposes, the term Config has been entered into the field. Other types of control fields may be used such as an input field to allow the user to enter information, buttons to allow the user to select options, etc.

FIG. 6 is an example of source code including executable source code, help code and documentation for generating the window illustrated in FIG. 5. Lines 2–3 is the first executable source code, as shown by the description ":/windowdef", which gives some basic descriptions of a panel or window that is being defined. Note that the panel is described as maximizable and sizable on line 3. This code causes the maximize button 820 and the sizing border 840 to be added to the panel as illustrated in FIG. 5. Lines 4–7 is the first set of documentation. Note that the documentation begins with a ":documentation" tag and ends with a ":/documentation." tag. This particular documentation code describes the panel defined in the previous executable code. Lines 8–10 and 11–13 are two sets of help code giving help information for the panel. Lines 16 through 17 are executable source code describing the element in the panel. A separate set of executable source code would be used for each element in the panel. Lines 18–20 include more help code for the panel element described in lines 16–17. Lines 21–24, 25–31, and 32–33 include documentation code describing various aspects of the panel element.

As a result of the executable code, help code and documentation being included together in the same source file, there are no problems with matching source code with documentation. In addition, the panel documentation that is generated by the compiler may include up to date information on the source code, the help code, and various pieces of information derived during the compilation process such as internal panel descriptors or names.

FIG. 7 is an illustration of a possible data structure to be used in a documentation bucket to pass extracted documentation information to the documentation organizer. The data structure includes all of the pieces of information needed by the documentation manager to generate the panel documentation. For example, the data structure includes the attributes of the panel which may be extracted from line 3 of the panel source code. In addition, the data structure includes the help and keys help which are located on lines 9 and 11, respectively, of the panel source code. In addition, help panel identifiers may be inserted in these fields of the data structure to give the internal identifier of the help panel which assists on the panel. The help panel identifiers-are identifiers generated by the compiler and are not found in the source code. This embodiment of the data structure includes information from the executable source code, the help code, the documentation code, and from the compiler. In addition, the data structure is not in the same organization as the source code.

FIGS. 8A, 8B, 8C and 8D are a copy of a program documentation file generated by the documentation organizer during compilation of the source code illustrated in FIG. 6. In the preferred embodiment this file is in a commonly used format called Bookmaster format which is utilized by a text manager software product called Bookmaster. Alternative formats and text managers may be used. This file is an organized report ready to be printed by Bookmaster. All of the desired elements from the data structure have been provided in this file. For example, the panel attributes are shown on lines 24–29, the help and keys help are shown on lines 53–58, and the panel description is shown on lines 7–8. As illustrated in the attributes and other areas, the organization of the documentation is different from the data structure. In addition, a comment field in the data structure is not included in this documentation file.

FIG. 9 is a copy of the final printout of the panel documentation report derived from the source code shown in FIG. 6. This illustration is a basic printout of the file shown in FIGS. 8A–8C with some formatting. There are four items on the final report that were not in the source code and were obtained during the compilation of the source code from the compiler. They are the help panel identifiers 900, 901 and 902 and the control label identifier 910. The help panel identifiers are internal identifiers of the help panels utilized by the object code. The control label identifier is an internal identifier of the control field on the panel. These identifiers will be used by an application programmer when interfacing with the object code that generates the panel.

Figure 10:
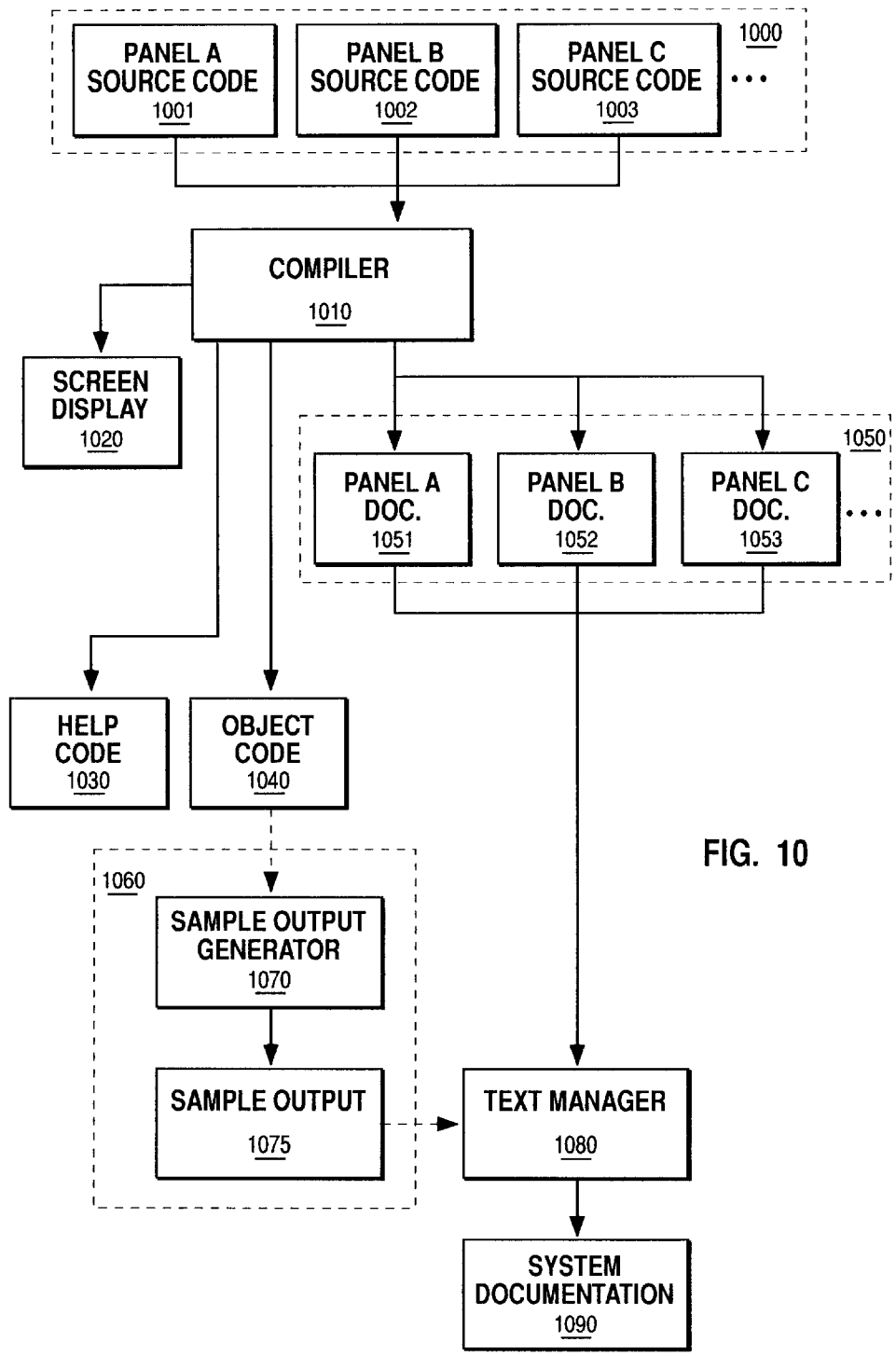
FIG. 10 is a block diagram of a multi-panel program being compiled into executable object code, program help, and program documentation using a single phase compiler.

FIG. 10 is a block diagram of a multi-panel program being compiled into executable object code, program help, and program documentation using a single stage compiler. In alternative embodiments, a two stage compiler may also be used. System source code 1000 is compiled by a program compiler 1010 to generate screen display 1020, help code 1030, object code 1040 and program documentation 1050. The system source code 1000 includes panel A source code 1001, panel B source code 1002, panel C source code 1003, etc. Each of the panel source codes is included in a single file in the preferred embodiment, thereby minimizing problems with handling multiple files (there may be hundreds of panels in some systems). The program screen display 1020 includes any error messages that may arise during the compilation process. The program documentation 1050 includes the organized documentation 1051, 1052, and 1053 of each of the panels in a single or separate file.

In an optional step 1060, a sample output generator 1070 may be used to generate a sample panel 1075 from each panel source code. For example, object code 1040 will generate multiple panels, each panel with a certain format, when the object code is executed. Of course, the numeric quantities used in panel are usually not available until the object code is executed. However, a sample of the output could be generated by the sample output generator with any numeric values either left blank or set to some predefined value such as zero.

In the preferred embodiment, a text manager 1080 such as Bookmaster formats the program documentation, which is then printed or displayed as program documentation 1090. The text manager may also insert a copy of the sample output into the program documentation to more fully describe the program.

Each of the program documentations 1040 and 1090 may be formatted and printed by text manager 1150 resulting in system documentation 1160.

Although the present invention has been fully described above with reference to specific embodiments, other alternate embodiments may be apparent to those of ordinary skill in the art. For example, a single data structure or one data structure per panel may be used to contain the documentation organizer. In addition, a panel generator program may include prompts for program documentation during panel generation. Therefore, the above description should not be taken as limiting the scope of the present invention as defined by the appended claims.

What is claimed is:

1. A data processing system for providing object code and a program documentation from a source code comprising:
   a) input means for receiving said source code, the source code including executable source code and source code documentation together in a first sequence; and
   b) compilation means, coupled to the input means, for generating said object code and said program documentation from said source code including:
      i) first means for generating said object code from said source code;
      ii) second means, coupled to said first means, for generating said program documentation including a plurality of selected portions of said executable source code and said source code documentation; and
      iii) third means for reordering said selected portions into a second predefined sequence independent of and different from said first sequence of said executable source code and source code documentation.

2. The data processing system of claim 1 wherein said second means for generating program documentation includes means for generating selected portions of said object code provided by said first means.

3. The data processing system of claim 2 wherein said second means for generating program documentation includes means for generating at least one control field identifier in said selected portions of said object code.

4. The data processing system of claim 2 further comprising means, coupled to said compilation means, for inspecting said object code and generating a description of object code output.

5. The data processing system of claim 4 further comprising means, coupled to said compilation means, for generating enhanced program documentation including said program documentation that has been reordered and said description of object code output.

6. The data processing system of claim 5 wherein said compilation means includes means for generating error messages.

7. The data processing system of claim 6 wherein said compilation means includes means, coupled to said first means, for generating a program listing including said error messages.

8. A method of providing object code and program documentation from a source code comprising the steps of:
 a) receiving said source code, said source code including executable source code and source code documentation together in a first sequence; and
 b) compiling said received source code by utilizing a processor to generate object code and program documentation from said source code including the steps of:
  i) generating object code from said source code; and
  ii) generating, in conjunction with said step of generating object code, program documentation including a plurality of selected portions of said executable source code and said source is code documentation;
  iii) reordering said selected portions into a second predefined sequence independent of and different from said first sequence of said executable source code and source code documentation.

9. The method of claim 8 wherein said step of generating program documentation includes a step of generating selected portions of said object code.

10. The method of claim 9 wherein said step of generating program documentation includes a step of generating at least one control field identifier in said selected portions of said object code.

11. The method of claim 8 further comprising the steps of inspecting said object code and generating a description of object code output.

12. The method of claim 11 further comprising the step of providing enhanced program documentation including said program documentation that has been reordered and said description of object code output.

13. The method of claim 12 wherein said step of compiling includes generating error messages.

14. The method of claim 13 wherein said step of compiling includes generating a program listing including said error messages.

15. A data processing system comprising a host computer including:
 a) a memory for storing data;
 b) input means for receiving said source code and storing said source code in the memory, the source code including executable source code and source code documentation together in a first sequence; and
 d) compilation means, coupled to the input means, including:
  i) first means for generating object code from said source code; and
  ii) second means, coupled to said first means, for generating program documentation including selected portions of said executable source code and said source code documentation;
  iii) third means for reordering said selected portions into a second predefined sequence independent of and different from said first sequence of said executable source code and source code documentation.

16. The system of claim 15 wherein said second means for generating program documentation includes means for generating selected portions of said object code provided by said first means.

17. The system of claim 16 wherein said second means for generating program documentation includes means for generating at least one control field identifier in said selected portions of said object code.

18. The system of claim 16 wherein said host computer includes means, coupled to said compilation means for inspecting said object code and generating a description of object code output.

19. The system of claim 18 wherein said host computer includes means, coupled to said compilation means, for generating enhanced program documentation including said program documentation that has been reordered and said description of object code output.

20. The system of claim 19 wherein said compilation means includes means for generating error messages.

21. The system of claim 20 wherein said compilation means includes means, coupled to said first means, for generating a program listing including said error messages.

22. A data processing system including a computer programming means residing in memory and executed by a processor, said data processing system comprising:
 processing means, instructed by said computer programming means, for compiling and generating object code and program documentation from source code, said source code including-executable source code and source code documentation, said program documentation including said source code documentation and portions of said executable source code together in a first sequence, said processing means including:
  a) first, means for generating object code from said source code; and
  b) second means, couple to said first means, for generating program documentation including a plurality of selected portions of said executable source code and said source code documentation;
  c) third means for reordering said selected portions into a second predefined sequence independent of and different from said first sequence of said executable source code and source code documentation.

23. The data processing system of claim 22 wherein said second means for generating program documentation includes means for generating selected portions of said object code provided by said first means.

24. The data processing system of claim 23 wherein said second means for generating program documentation includes means for generating at least one control field identifier in said selected portions of said object code.

25. The data processing system of claim 23 further comprising means, coupled to said processing means, for inspecting said object code and generating a description of object code output.

26. The data processing system of claim 25 further comprising means, coupled to said processing means for generating enhanced program documentation including said program documentation that has been reordered and said description of object code output.

27. The data processing system of claim 26 wherein said processing means includes means for generating error messages.

28. The data processing system of claim 27 wherein said processing means includes means, coupled to said first means, for generating a program listing including said error messages.

* * * * *